(12) United States Patent
Yoshimura et al.

(10) Patent No.: US 9,860,400 B2
(45) Date of Patent: Jan. 2, 2018

(54) LEARNING SUPPORT DEVICE AND LEARNING SUPPORT METHOD

(71) Applicant: KYOCERA Document Solutions Inc., Osaka (JP)

(72) Inventors: Sachiko Yoshimura, Osaka (JP); Hidehiko Akuta, Osaka (JP); Toshihide Higashimori, Osaka (JP); Yumi Nakagoshi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 2 days.

(21) Appl. No.: 15/096,766

(22) Filed: Apr. 12, 2016

(65) Prior Publication Data
US 2016/0307075 A1 Oct. 20, 2016

(30) Foreign Application Priority Data

Apr. 15, 2015 (JP) ................................ 2015-083236

(51) Int. Cl.
*G06K 9/18* (2006.01)
*H04N 1/00* (2006.01)
*G06F 15/18* (2006.01)
*H04N 1/10* (2006.01)
*H04N 1/12* (2006.01)
*G06K 9/22* (2006.01)

(52) U.S. Cl.
CPC ......... *H04N 1/00416* (2013.01); *G06F 15/18* (2013.01); *G06K 9/222* (2013.01); *H04N 1/0036* (2013.01); *H04N 1/10* (2013.01); *H04N 1/121* (2013.01); *G06K 2209/01* (2013.01)

(58) Field of Classification Search
CPC .... G06F 15/18; G06K 9/222; G06K 2209/01; H04N 1/0036; H04N 1/00416; H04N 1/10; H04N 1/121
See application file for complete search history.

(56) References Cited

U.S. PATENT DOCUMENTS 6,081,621 A * 6/2000 Ackner .................. G06K 9/186
382/209
6,335,986 B1 * 1/2002 Naoi ................... G06K 9/00463
382/190

(Continued)

FOREIGN PATENT DOCUMENTS

JP 05-113747 * 5/1993
JP 5113747 B2 10/2012

*Primary Examiner* — Amara Abdi
(74) *Attorney, Agent, or Firm* — Stein IP, LLC

(57) ABSTRACT

A learning support device includes a storage portion which stores the images of model characters, an image reading portion which reads a practice sheet to generate image data, a determination portion which extracts, as an image of a determination target character, an image of a handwritten character present within the image data on the practice sheet, which acquires, from the storage portion, the image of the model character and which compares the image of the model character with the image of the determination target character so as to perform a pass/fail determination, a generation portion which generates image data on a report that includes result information indicating the result of the pass/fail determination and an output portion which outputs the report including the result information.

11 Claims, 9 Drawing Sheets

(56) References Cited

U.S. PATENT DOCUMENTS

| | | | |
|---|---|---|---|
| 2003/0113021 A1* | 6/2003 | Shiotani | G06K 9/036 382/209 |
| 2004/0071333 A1* | 4/2004 | Douglas | G06K 9/726 382/137 |
| 2010/0215277 A1* | 8/2010 | Huntington | G06K 9/00865 382/218 |
| 2010/0239166 A1* | 9/2010 | Zhang | G06K 9/2054 382/176 |
| 2011/0064316 A1* | 3/2011 | Hamamura | G06K 9/6215 382/218 |
| 2012/0213442 A1* | 8/2012 | Oda | G06K 9/6814 382/182 |
| 2013/0216995 A1* | 8/2013 | Yoon | G09B 5/00 434/365 |

* cited by examiner

DETERMINATION RESULT REPORT

LEARNING SUPPORT DEVICE AND LEARNING SUPPORT METHOD

This application is based upon and claims the benefit of priority from the corresponding Japanese Patent Application No. 2015-083236 filed on Apr. 15, 2015, the entire contents of which are incorporated herein by reference.

BACKGROUND

The present disclosure relates to a learning support device and a learning support method for supporting a learner who learns how to write characters and an instructor who instructs the learner.

Conventionally, a learning support device for supporting a learner who learns how to write characters and an instructor who instructs the learner is known. The conventional learning support device includes an input display device. The input display device is a learning terminal (user terminal) which is used by the learner, and includes a display device formed with a liquid crystal display device and a transparent touch panel device provided in the display device.

In the conventional learning support device, a model character which is a mode of a character to be learned is displayed on the display device. Then, the learner brings a touch pen or the like into contact with the transparent touch panel device, follows (trances) the model character displayed on the display device and thereby learns how to write the character.

In the conventional learning support device, when the traced character (the character tranced by the learner) is input to the learning terminal, based on the amount of displacement between the model character and the traced character, whether or not the character is properly tranced is determined. As a result of the determination, when the character is not properly traced, a message indicating the fact (message for encouraging the learner to trace it again) is displayed on the display device.

SUMMARY

According to a first aspect of the present disclosure, there is provided a learning support device for supporting a learner who learns how to write a character and an instructor who instructs the learner, the learning support device including a storage portion, an image reading portion, a determination portion, a generation portion and an output portion. The storage portion stores the images of a plurality of model characters corresponding to a plurality of characters to be learned. The image reading portion reads a practice sheet where a character is handwritten by the learner so as to generate image data on the practice sheet. The determination portion extracts, as an image of a determination target character, an image of the handwritten character present within the image data on the practice sheet, acquires, from the storage portion, among the model characters, the image of the model character corresponding to the determination target character and compares the image of the model character with the image of the determination target character so as to perform a pass/fail determination as to whether or not the determination target character is properly written. The generation portion generates image data on a report that includes result information indicating the result of the pass/fail determination performed by the determination portion. The output portion outputs the report including the result information.

According to a second aspect of the present disclosure, there is provided a learning support method for supporting a learner who learns how to write a character and an instructor who instructs the learner, the learning support method including: a step of reading a practice sheet where a character is handwritten by the learner so as to generate image data on the practice sheet; a step of extracting, as an image of a determination target character, an image of the handwritten character present within the image data on the practice sheet, acquiring, from a storage portion which stores the images of a plurality of model characters corresponding to a plurality of characters to be learned, among the model characters, the image of the model character corresponding to the determination target character and comparing the image of the model character with the image of the determination target character so as to perform a pass/fail determination as to whether or not the determination target character is properly written; a step of generating image data on a report that includes result information indicating the result of the pass/fail determination; and a step of outputting the report including the result information.

DETAILED DESCRIPTION

<Outline of Learning Support Device>

Figure 1:
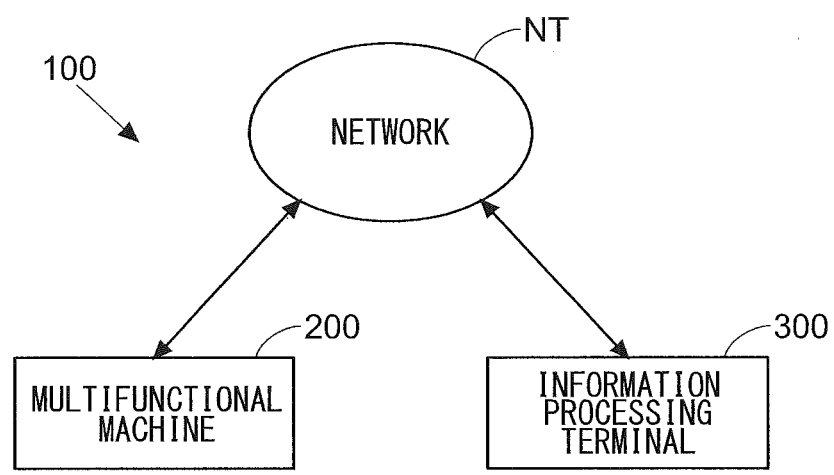
FIG. 1 is a schematic diagram of a learning support device according to an embodiment of the present disclosure.

As shown in FIG. 1, the learning support device 100 of the present embodiment is a device for supporting a learner who learns how to write characters and an instructor who instructs the learner, and includes a multifunctional machine 200 and an information processing terminal 300. The multifunctional machine 200 and the information processing terminal 300 are connected through a network NT such that they can communicate with each other. In other words, the learning support device 100 of the present embodiment can be said to be a learning support system formed with the multifunctional machine 200 and the information processing terminal 300 which are connected such that they can communicate with each other.

The multifunctional machine 200 is an image forming apparatus that has a scan function and a print function. In other words, the multifunctional machine 200 can execute a job for reading an original document and a job for printing an image on a sheet. The information processing terminal 300 is a computer (user terminal) which is used by a user (such as the learner or the instructor). For example, the information processing terminal 300 is a note type or a desktop type personal computer. A portable information terminal such as a smartphone or a tablet may be the information processing terminal 300.

<Configuration of Multifunctional Machine>

Figure 2:
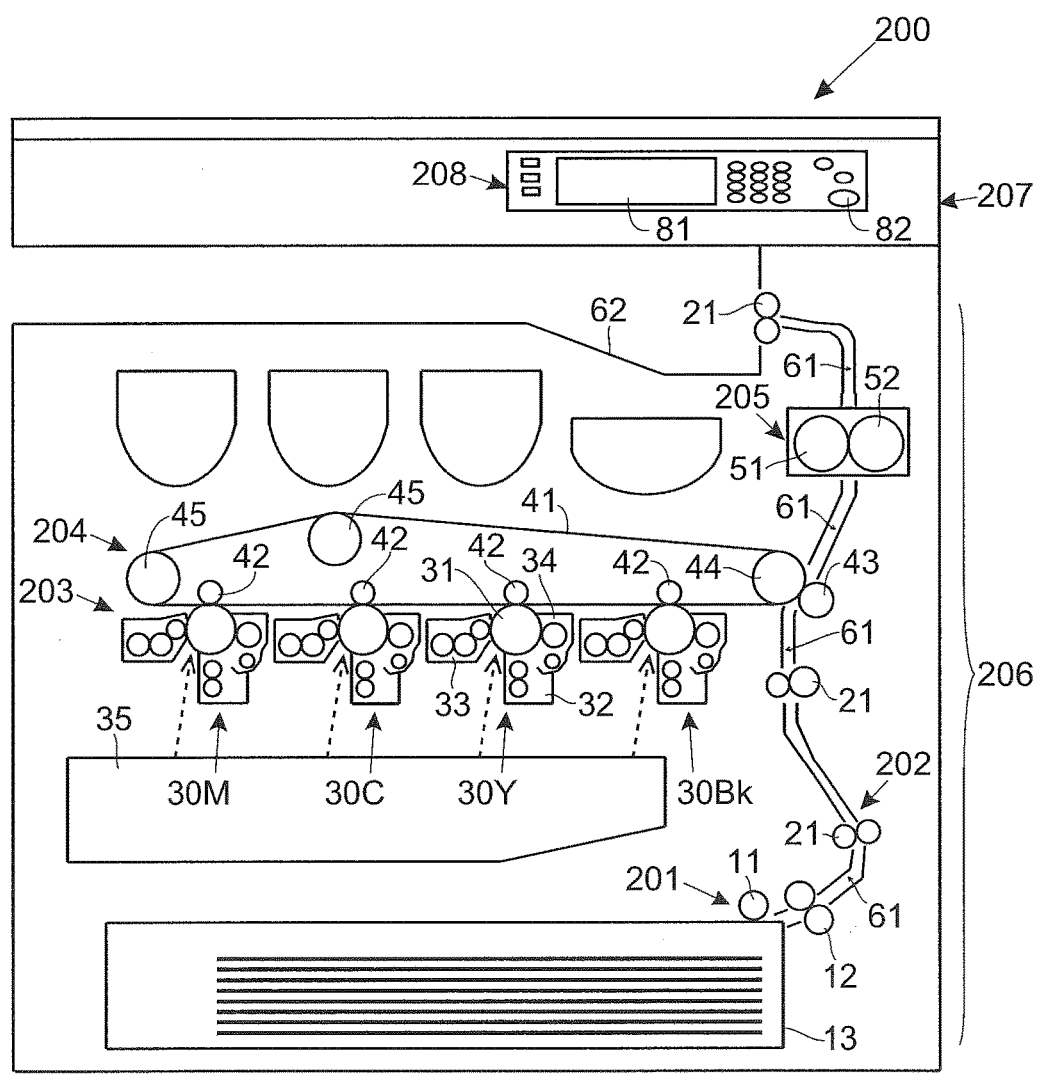
FIG. 2 is a schematic diagram of a multifunctional machine which forms the learning support device according to the embodiment of the present disclosure.

As shown in FIG. 2, the multifunctional machine 200 includes a print portion 206 that includes a paper feed portion 201, a sheet transport portion 202, an image formation portion 203, an intermediate transfer portion 204 and a fixing portion 205. The print portion 206 transports a sheet along a sheet transport path 61. The print portion 206 forms a toner image based on image data on a page to be printed. The print portion 206 prints the toner image on the sheet being transported. The print portion 206 corresponds to an "output portion".

The paper feed portion 201 includes a pickup roller 11 which is arranged in a sheet supply port of the sheet transport path 61 and a paper feed roller pair 12, and supplies sheets stored in a sheet cassette 13 to the sheet transport path 61. The sheet transport portion 202 includes a plurality of transport roller pairs 21 arranged along the sheet transport path 61, transports the sheet supplied to the sheet transport path 61 to a transfer nip and to a fixing nip in this order and ejects the sheet to an ejection tray 62.

The image formation portion 203 includes a photosensitive drum 31, a charging device 32, a development device 33, a drum cleaning device 34 and an exposure device 35. Here, the image formation portion 203 is classified into mechanical portions 30Bk, 30Y, 30C and 30M corresponding to the colors of black (Bk), yellow (Y), cyan (C) and magenta (M). Each of the mechanical portions 30Bk, 30Y, 30C and 30M has the photosensitive drum 31, the charging device 32, the development device 33 and the drum cleaning device 34, and forms a toner image of the corresponding color. The mechanical portions 30Bk, 30Y, 30C and 30M are arranged on the outside of an intermediate transfer belt 41 such that the outer circumferential surface of the photosensitive drum 31 is in contact with the intermediate transfer belt 41 which will be described later. The exposure device 35 is used in common for the individual colors, and forms an electrostatic latent image on the circumferential surface of the photosensitive drum 31.

The intermediate transfer portion 204 includes the intermediate transfer belt 41, a primary transfer roller 42 and a secondary transfer roller 43. The intermediate transfer belt 41 is laid in a tensioned state on a drive roller 44 and a driven roller 45. The primary transfer roller 42 is arranged on the inside of the intermediate transfer belt 41, and sandwiches the intermediate transfer belt 41 between the primary transfer roller 42 and the photosensitive drum 31. The secondary transfer roller 43 is arranged opposite the drive roller 44 through the intermediate transfer belt 41, and forms the transfer nip between the secondary transfer roller 43 and the intermediate transfer belt 41. Then, the toner images (toner images on the outer circumferential surface of the photosensitive drum 31) of the individual colors formed by the image formation portion 203 are primarily transferred to the intermediate transfer belt 41 so as to be sequentially superimposed without being displaced, and are then secondarily transferred to the sheet which enters the transfer nip.

The fixing portion 205 includes a heating roller 51 and a pressure roller 52. The heating roller 51 incorporates a heating source. The pressure roller 52 is pressed onto the heating roller 51 to form the fixing nip between the pressure roller 52 and the heating roller 51. In this way, when the sheet to which the toner image is transferred enters the fixing nip, the sheet is heated and pressurized, and thus the toner image is fixed to the sheet.

The multifunctional machine 200 includes an image reading portion 207. The image reading portion 207 reads an original document to generate image data. For example, the print portion 206 performs printing based on the image data obtained by reading the original document with the image reading portion 207.

In the multifunctional machine 200, an operation panel 208 is also provided. The operation panel 208 includes a liquid crystal display panel 81 with a touch panel. The operation panel 208 includes hard keys 82 such as a start key and a numerical keypad. The operation panel 208 receives various types of inputs from the user.

Figure 3:
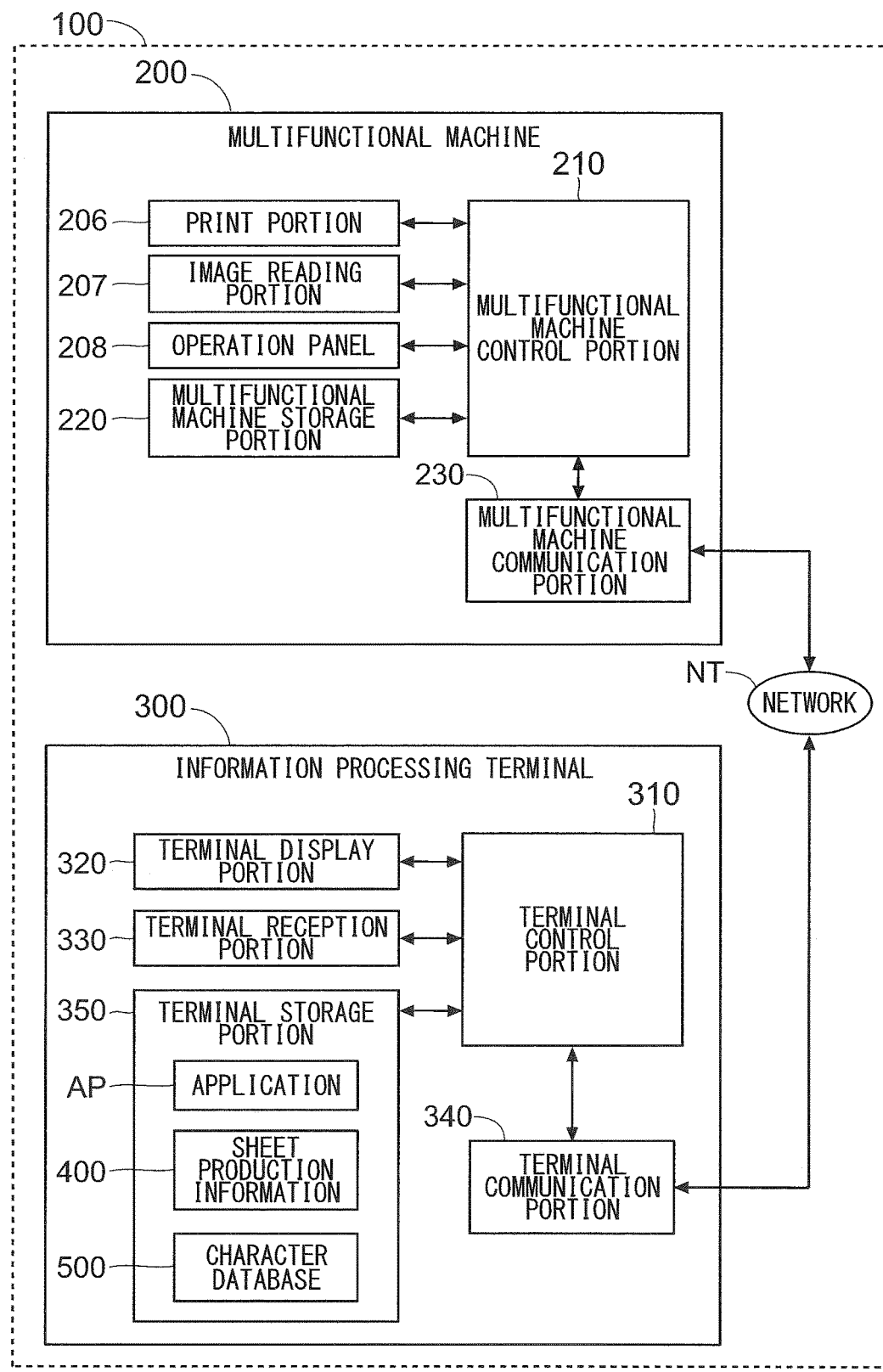
FIG. 3 is a block diagram showing the hardware configuration of the multifunctional machine and an information processing terminal which form the learning support device according to the embodiment of the present disclosure.

As shown in FIG. 3, the multifunctional machine 200 includes a multifunctional machine control portion 210 (CPU). A multifunctional machine storage portion 220 (memory) is connected to the multifunctional machine control portion 210. The multifunctional machine storage portion 220 stores programs and data for control. Then, the multifunctional machine control portion 210 controls, based on the programs and data for control stored in the multifunctional machine storage portion 220, the printing operation of the print portion 206 and the reading operation of the image reading portion 207. Furthermore, the multifunctional machine control portion 210 controls the display operation of the operation panel 208, and detects an operation performed on the operation panel 208.

The multifunctional machine 200 also includes a multifunctional machine communication portion 230 (communication circuit). The multifunctional machine communication portion 230 is connected to the network NT. Then, the multifunctional machine communication portion 230 transmits and receives various types of data to and from the information processing terminal 300 through the network NT.

<Configuration of Information Processing Terminal>

As shown in FIG. 3, the information processing terminal 300 includes a terminal control portion 310, a terminal display portion 320, a terminal reception portion 330, a terminal communication portion 340 and a terminal storage portion 350. The terminal control portion 310 corresponds to a "determination portion" and a "generation portion", the terminal display portion 320 corresponds to a "display portion", the terminal reception portion 330 corresponds to a "reception portion" and the terminal storage portion 350 corresponds to a "storage portion".

The terminal control portion 310 (CPU) controls the entire information processing terminal 300. The terminal display portion 320 (display) displays various types of screens, and the terminal reception portion 330 (keyboard or pointing device) receives various types of inputs from the user. For example, the terminal control portion 310 detects the details of an input received by the terminal reception portion 330, and makes, based on the result of the detection, the terminal display portion 320 switch the display screen.

The terminal communication portion 340 (communication circuit) receives an instruction from the terminal control portion 310, accesses the network NT and transmits and receives various types of data to and from the multifunctional machine 200. The terminal storage portion 350 (memory) stores programs and data for control of the information processing terminal 300. Based on the programs and data for control stored in the terminal storage portion 350, the terminal control portion 310 controls the individual portions of the information processing terminal 300.

Here, in the terminal storage portion 350, application software AP for learning support (hereinafter simply referred to as the application AP) is stored. Then, when the terminal reception portion 330 receives, from the user, an operation for stating up the application AP, the terminal control portion 310 starts up the application AP to perform learning support processing based on the application AP.

Specifically, the terminal control portion 310 performs, as the learning support processing, data generation processing that generates image data on a practice sheet P1 (see FIG. 5) for learning how to write characters. The terminal control portion 310 also performs, as the learning support processing, pass/fail determination processing that determines whether or not a character handwritten on the practice sheet P1 is properly written.

The image data on the practice sheet P1 (see FIG. 5) generated by the terminal control portion 310 is transmitted through the terminal communication portion 340 to the multifunctional machine 200. Then, when the multifunctional machine 200 receives the image data on the practice sheet P1, the multifunctional machine 200 prints the practice sheet P1 based on the image data and outputs it. In other words, the data generation processing performed by the terminal control portion 310 is also processing (practice sheet production processing which is processing for producing the practice sheet P1) for making the multifunctional machine 200 print and output the practice sheet P1.

Figure 4:
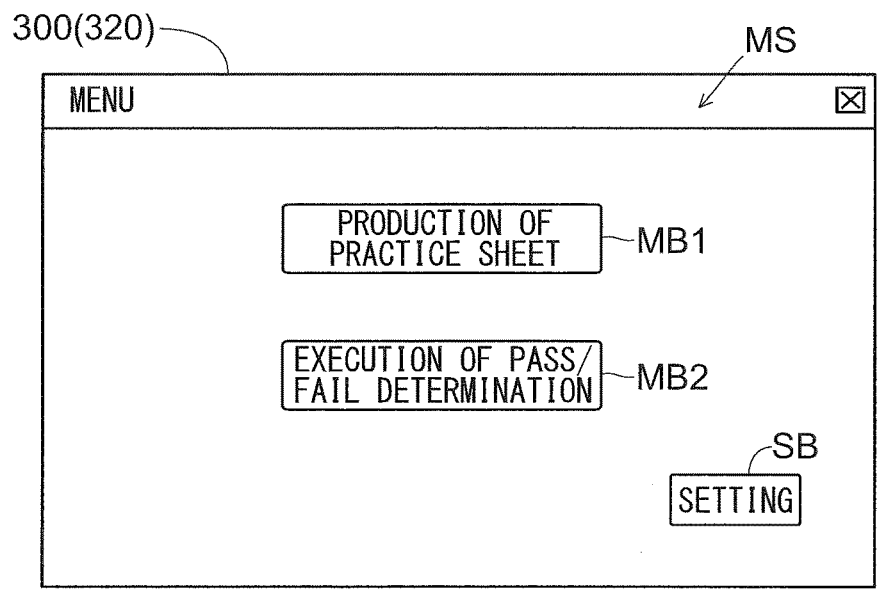
FIG. 4 is a diagram showing an example of a menu screen displayed on the learning support device (the information processing terminal) according to the embodiment of the present disclosure.

For example, when the application AP is started up, the terminal control portion 310 makes the terminal display portion 320 display a menu screen MS (see FIG. 4). The menu screen MS is a screen for receiving, from the user, an instruction to produce the practice sheet P1 (see FIG. 5) and an instruction to perform the pass/fail determination.

As shown in FIG. 4, in the menu screen MS, menu buttons MB1 and MB2 are provided. The menu button MB1 is a button for receiving the instruction to produce the practice sheet P1 (see FIG. 5), and the menu button MB2 is a button for receiving the instruction to perform the pass/fail determination. In other words, when an operation of selecting the menu button MB1 is performed in the menu screen MS, the terminal control portion 310 performs the data generation processing as the learning support processing whereas when an operation of selecting the menu button MB2 is performed in the menu screen MS, the terminal control portion 310 performs the pass/fail determination processing as the learning support processing. The learning support processing will be described in detail later.

For example, when the application AP is started up, the terminal control portion 310 displays, as the initial screen, a screen for selecting a character to be learned. Then, the terminal control portion 310 receives, from the learner or the instructor, an instruction to select the character to be learned. Examples of the character to be learned can include kanji, hiragana, katakana, alphabet, simplified character and Hangul.

<Production of Practice Sheet>

The practice sheet P1 produced by the learning support device 100 will first be described with reference to FIG. 5. Although in the following description, a case where the character to be learned is a character of the alphabet is used as an example, the character to be learned may be a character other than the alphabet.

On the practice sheet P1, squares (in FIG. 5, it is assumed that 4 squares vertically×4 squares horizontally) formed by combining frame lines and rules lines are printed. For example, row numbers (1 to 4) are attached to the individual rows. Within the square on the left side of each row, the model character which is the model of the character to be learned is printed. In FIG. 5, as an example, the characters of "A", "B", "C" and "D" are shown as the model characters.

In the practice sheet P1, the squares starting from the second square from the left side of each row are regions in which the characters to be learned (characters corresponding to the model character) are handwritten. In other words, on the characters which are handwritten in the regions, the pass/fail determination processing is performed. In the following description, the region in which the character to be subjected to the pass/fail determination processing is handwritten is referred to as a determination region JA, and the character to be subjected to the pass/fail determination processing (the handwritten character in the determination region JA) is referred to as a determination target character. In FIG. 5, for convenience, symbols are attached to only part of a plurality of determination regions JA (in the example shown in FIG. 5, the number of determination regions JA is 12).

Identification information ID for identifying a model character in each row is attached to the row. Although there is no particular limitation, the identification information ID is an image which is obtained by encrypting the character code of the model character, and is printed in the form of a barcode or a QR code (registered trade mark). In FIG. 5, as an example, the identification information ID is represented by a barcode. Although described in detail later, the identification information ID is used for identifying the model character when the pass/fail determination processing is performed.

Figure 5:
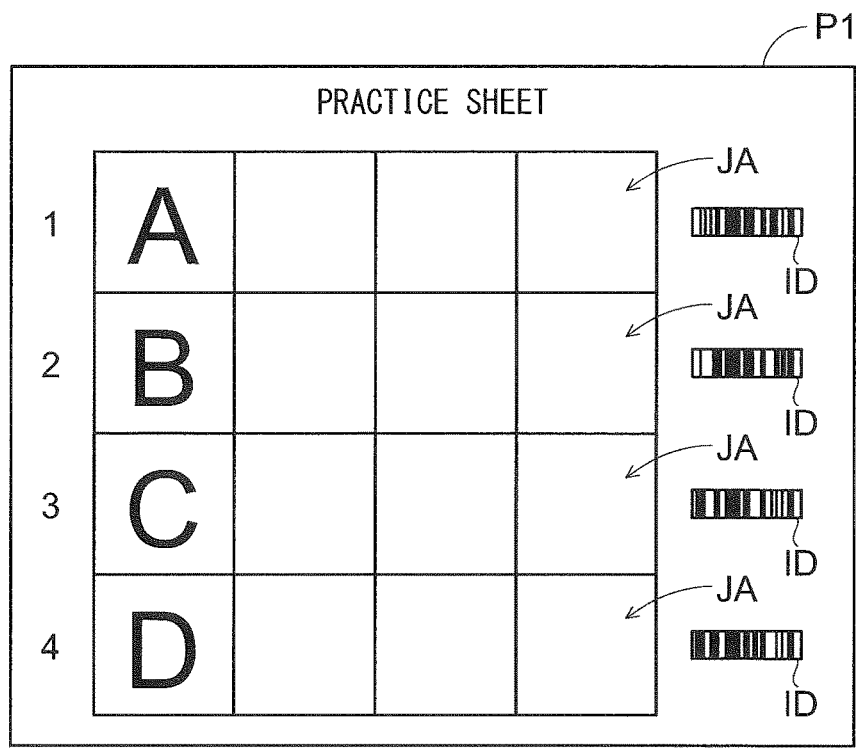
FIG. 5 is a diagram showing an example of a practice sheet printed in the learning support device according to the embodiment of the present disclosure.

The practice sheet P1 shown in FIG. 5 is an example, and the layout of the practice sheet P1 can be arbitrarily changed. In one example, the number and size of squares, the font and size of model characters, the size of sheets and the like can be changed.

For example, as shown in FIG. 4, in the menu screen MS, a setting button SB is provided. When in the menu screen MS, an operation is performed on the setting button SB, the terminal control portion 310 instructs the terminal display portion 320 to display a layout setting screen (not shown) for changing the layout setting of the practice sheet P1 from a default setting. Then, when the terminal control portion 310 performs the data generation processing, the terminal control portion 310 generates image data on the practice sheet P1 based on the details of settings made in the layout setting screen.

The flow of the processing (the data generation processing which is part of the learning support processing) when the practice sheet P1 is produced will be described below with reference to a flowchart shown in FIG. 6.

Figure 6:
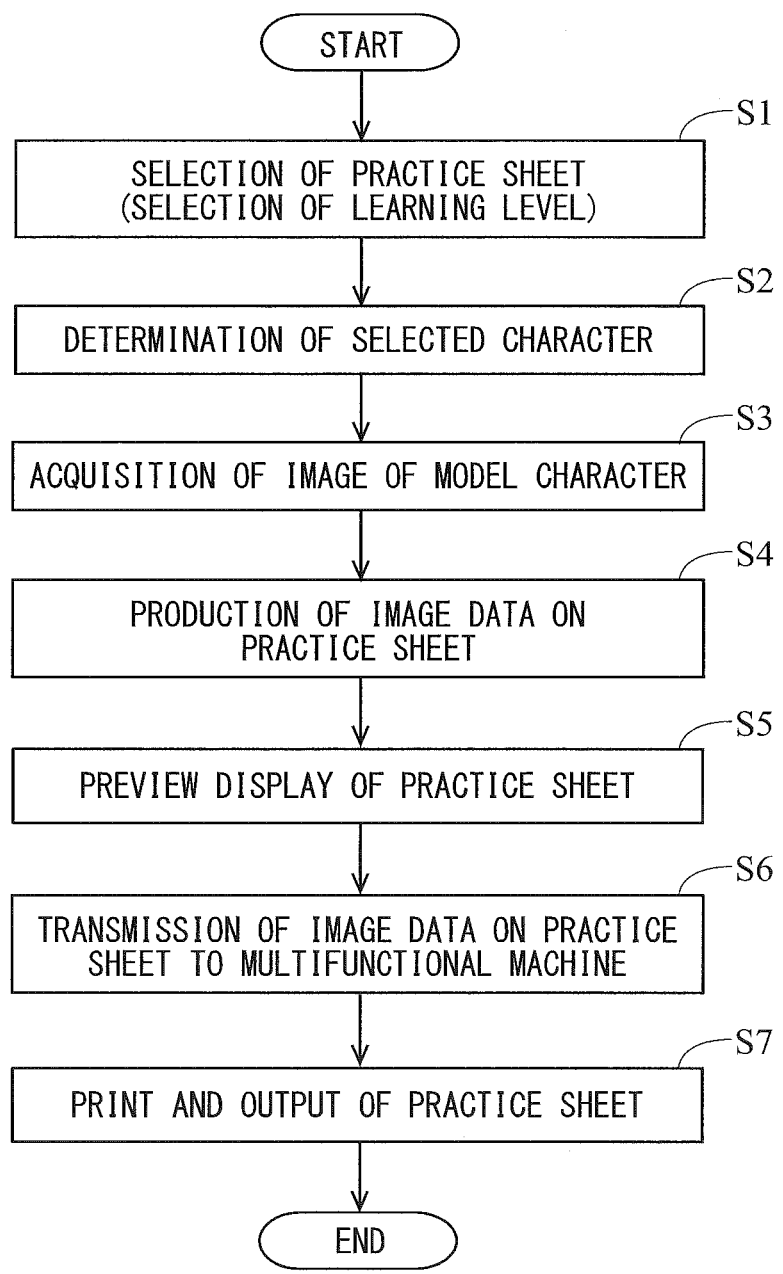
FIG. 6 is a flowchart for illustrating the flow of processing when the practice sheet is printed in the learning support device according to the embodiment of the present disclosure.

The start of the flowchart shown in FIG. 6 is a time when in the menu screen MS (see FIG. 4) displayed on the information processing terminal 300, the operation of selecting the menu button MB1 is performed (when the instruction to produce the practice sheet P1 is received).

Figure 7:
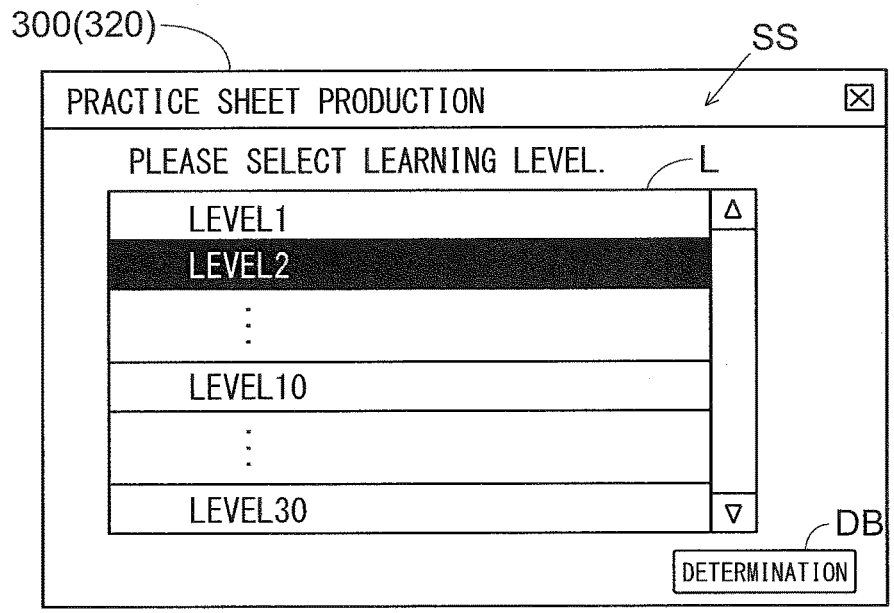
FIG. 7 is a diagram showing an example of a selection screen (screen for selecting a learning level) displayed on the learning support device (information processing terminal) according to the embodiment of the present disclosure.

In step S1, the terminal control portion 310 makes the terminal display portion 320 display a selection screen SS (see FIG. 7). The selection screen SS is a screen for receiving an instruction to select the practice sheet P1 (practice sheet P1 desired to be produced) desired by the user among a plurality of practice sheets P1 prepared according to the learning level of the learner. In other words, in step S1, the instruction to select the practice sheet P1 corresponding to the learning level of the learner (instruction to select the learning level) is received. The reception of the selection instruction in the selection screen SS is performed through the terminal reception portion 330.

In order for the instruction to select the practice sheet P1 corresponding to the learning level of the learner to be received, as shown in FIG. 7, in the selection screen SS, a list L is provided in which learning levels at a plurality of stages are indicated as choices. For example, the list L in which grades and semesters are indicated as choices may be provided in the selection screen SS such that it is possible to select the learning level from the grades and semesters. Alternatively, the list L in which the pages of a teaching material (or the titles of works used in the teaching material) are indicated as choices may be provided in the selection screen SS such that it is possible to select the learning level from the pages of the teaching material. Black-and-white reversal is performed on the column of display of the learning level which is selected among a plurality of learning levels.

With reference back to FIG. 6, when the instruction to select the practice sheet P1 (instruction to select the learning level) is received, the process is transferred from step 1 to step S2. When the process is transferred to step S2, the terminal control portion 310 determines the selected character (the character code thereof) which is the character corresponding to the learning level selected in the selection screen SS. Here, in the terminal storage portion 350, sheet production information 400 (see FIG. 3) for producing the practice sheet P1 corresponding to the learning level of the learner is stored. The sheet production information 400 is information in which the characters (the character codes thereof) corresponding to the learning levels classified into a plurality of stages are previously determined. In other words, information in which learning levels are associated with a plurality of characters to be learned is the sheet production information 400. The determination of the selected character by the terminal control portion 310 in step S2 is performed based on the sheet production information 400.

Thereafter, in step S3, the terminal control portion 310 acquires the image of the model character corresponding to the selected character. Here, in the terminal storage portion 350, a character database 500 (see FIG. 3) is stored which includes the images of a plurality of model characters corresponding to a plurality of characters to be learned. The images of the model characters are associated with the character codes of the corresponding model characters. Furthermore, images (not shown) indicating the phonetic symbols of the corresponding model characters are added to the images of the model characters. In step S3, among the images of the model characters within the character database 500, the image of the model character associated with the same character code as the character code of the selected character (including the image (not shown) indicating the phonetic symbol of the model character) is acquired by the terminal control portion 310.

After the acquisition of the image of the model character, in step S4, the terminal control portion 310 generates, as the image data on the practice sheet P1, image data including the image of the model character corresponding to the selected character (including the image (not shown) indicating the phonetic symbol of the model character). In the image data generated here, the squares that indicate regions (determination regions JA) in which characters corresponding to the model character are handwritten are included. Furthermore, the image of the identification information ID is also included.

Figure 8:
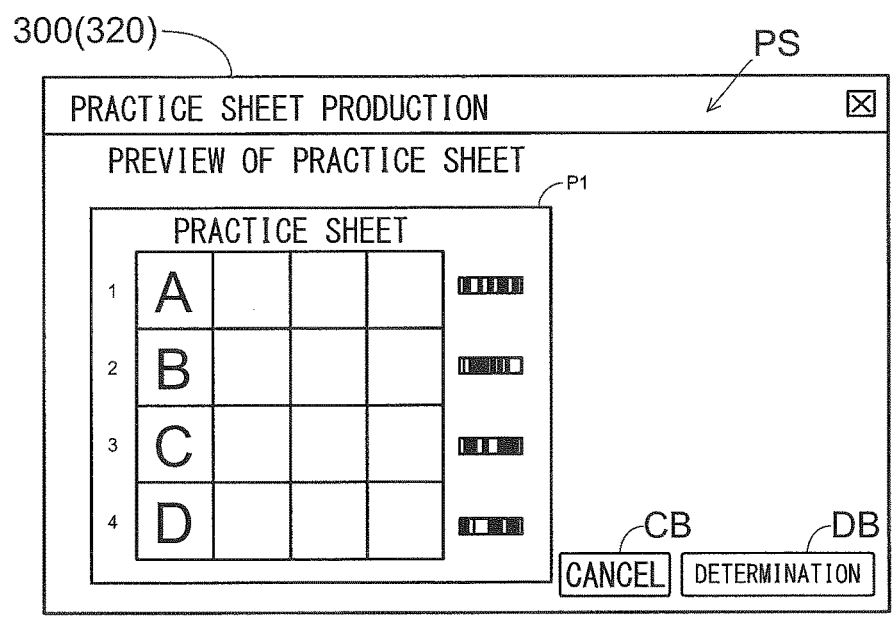
FIG. 8 is a diagram showing an example of a preview of the practice sheet displayed on the learning support device (information processing terminal) according to the embodiment of the present disclosure.

Then, in step S5, the terminal control portion 310 makes the terminal display portion 320 display a preview screen PS (see FIG. 8) in which the preview of the practice sheet P1 including the image of the model character corresponding to the selected character is provided. For example, in the preview screen PS, as shown in FIG. 8, a cancel button CB and a determination button DB are provided. Then, when an operation is performed on the cancel button CB, the terminal control portion 310 instructs the terminal display portion 320 to return the display screen to the selection screen SS (see FIG. 7). On the other hand, when an operation is performed on the determination button DB, the terminal control portion 310 determines that the practice sheet P1 which is currently displayed is a target to be printed.

In the selection screen SS (see FIG. 7), the determination button DB may also be provided. In this case, when an operation is performed on the determination button DB in the selection screen SS, the terminal control portion 310 does not make the terminal display portion 320 display the preview screen PS (see FIG. 8), and determines that the practice sheet P1 corresponding to the learning level selected in the selection screen SS is a target to be printed.

With reference back to FIG. 6, when the practice sheet P1 which is the target to be printed is determined, the process is transferred from step S5 to step S6. When the process is transferred to step S6, the terminal control portion 310 instructs the terminal communication portion 340 to transmit, to the multifunctional machine 200, the image data on the practice sheet P1 which is the target to be printed. In other words, the multifunctional machine communication portion 230 receives, from the information processing terminal 300, the image data on the practice sheet P1 which is the target to be printed. Here, a print output command based on the image data is added to the image data transmitted from the information processing terminal 300 to the multifunctional machine 200.

When the multifunctional machine communication portion 230 receives the image data on the practice sheet P1 which is the target to be printed, the process is transferred to step S7. When the process is transferred to step S7, the multifunctional machine control portion 210 instructs the print portion 206 to print the practice sheet P1 which is the target to be printed.

In this way, the practice sheet P1 as shown in FIG. 5 is output from the multifunctional machine 200. Here, on the practice sheet P1 output from the multifunctional machine 200, the image of the model character corresponding to the selected character, the image (not shown) indicating the phonetic symbol of the model character and the squares indicating the regions (determination regions JA) in which characters corresponding to the model character are handwritten are printed. Furthermore, the identification information ID on the model character corresponding to the selected character is also printed.

For example, when the printing of the practice sheet P1 is completed in the multifunctional machine 200, the multifunctional machine control portion 210 instructs the multifunctional machine communication portion 230 to transmit a print completion notification to the information processing terminal 300. When the terminal communication portion 340 receives the notification, the terminal control portion 310 displays, on the terminal display portion 320, for example, a message indicating that the printing of the practice sheet P1 is completed. In other words, the terminal display portion 320 displays the message to provide the notification that the printing of the practice sheet P1 is completed.

<Pass/Fail Determination as to Whether or not Character is Properly Written>

The flow of the processing (the pass/fail determination processing which is part of the learning support processing) when whether or not a character handwritten on the practice sheet P1 is properly written is determined will be described below with reference to a flowchart shown in FIG. 9.

Figure 9:
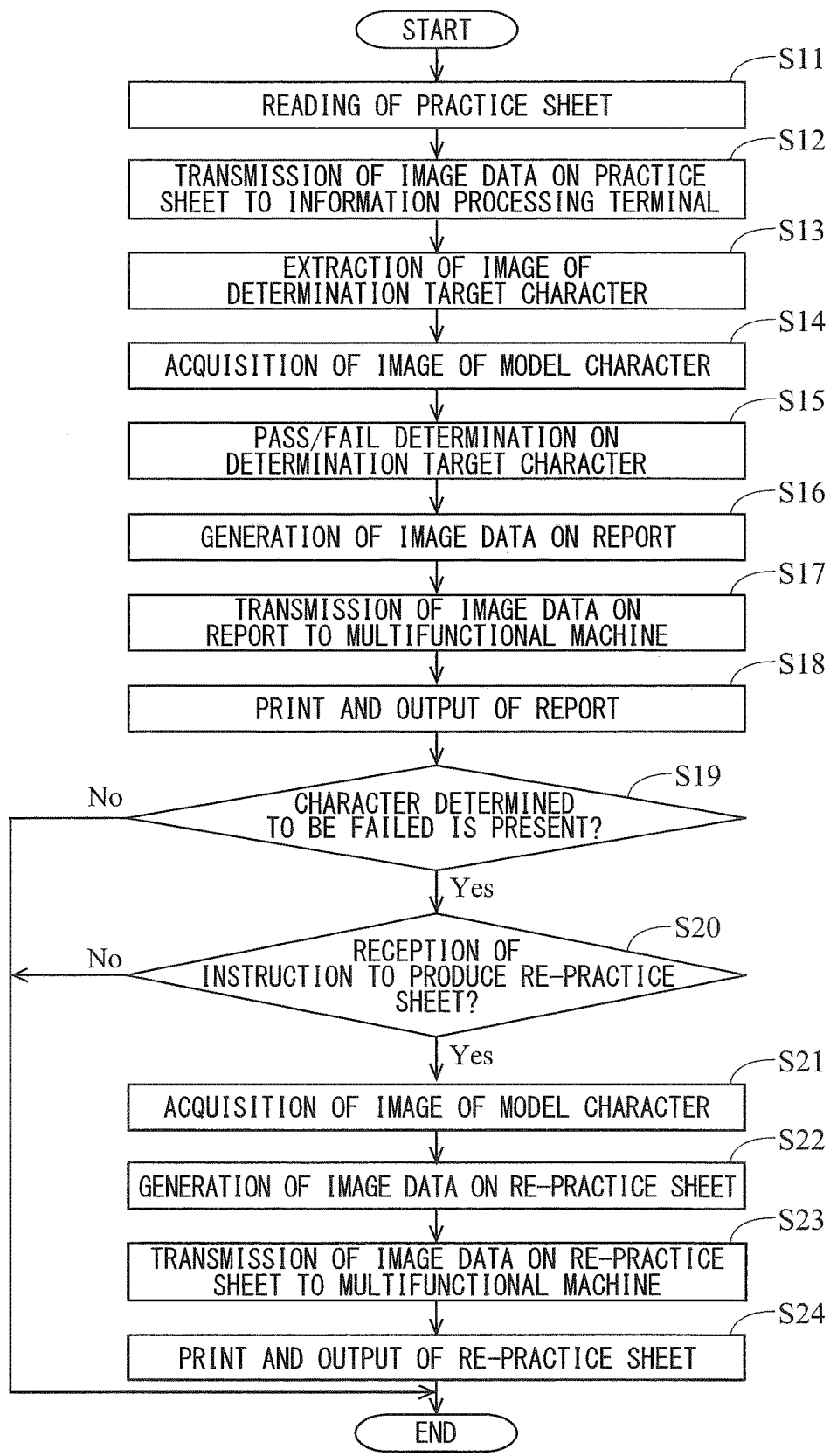
FIG. 9 is a flowchart for illustrating the flow of processing when whether a determination target character is passed or failed is determined in the learning support device according to the embodiment of the present disclosure.

At the time of the start of the flowchart shown in FIG. 9, the practice sheet P1 (sheet on which a character is handwritten by the learner) is set, in the multifunctional machine 200, as a target to be read by the image reading portion 207. Then, the start of the flowchart shown in FIG. 9 is a time when in the menu screen MS (see FIG. 4) displayed on the information processing terminal 300, the operation of selecting the menu button MB2 is performed (when the instruction to perform the pass/fail determination is received). Alternatively, when an operation (operation of pressing down the start key on the operation panel 208) for scanning the multifunctional machine 200 is performed, the flowchart shown in FIG. 9 may be started.

In step S11, the multifunctional machine control portion 210 makes the image reading portion 207 read the practice sheet P1 (sheet on which a character is handwritten by the learner). For example, when in the menu screen MS (see FIG. 4), the operation of selecting the menu button MB2 is performed, a command for executing the reading of the practice sheet P1 is transmitted from the information processing terminal 300 to the multifunctional machine 200, and the multifunctional machine 200 receives the execution command to start the reading of the practice sheet P1. The execution command transmitted from the information processing terminal 300 to the multifunctional machine 200 at this time includes a command for transferring the image data obtained by reading the practice sheet P1 to the information processing terminal 300.

When the reading of the practice sheet P1 by the image reading portion 207 is completed, in step S12, the multifunctional machine control portion 210 instructs the multifunctional machine communication portion 230 to transmit, to the information processing terminal 300, the image data on the practice sheet P1 obtained by reading with the image reading portion 207. In other words, the terminal communication portion 340 receives the image data on the practice sheet P1 from the multifunctional machine 200.

Then, in step S13, the terminal control portion 310 extracts, as the image of the determination target character, the image of the handwritten character present within the image data on the practice sheet P1. Here, the terminal control portion 310 deals with an image present in the determination region JA as the image of the determination target character. When a plurality of images of the handwritten character are present, all the images of the handwritten character are extracted as the image of the determination target character.

In step S14, the terminal control portion 310 acquires, from the character database 500 (see FIG. 3) stored in the terminal storage portion 350, the image of the model character corresponding to the determination target character. For example, here, the image of the identification information ID (see FIG. 5) present within the image data on the practice sheet P1 is analyzed, and thus the character code of the model character corresponding to the determination target character is determined. Then, the image of the model character associated with the same character code as the determined character code is acquired from the character database 500.

Thereafter, in step S15, the terminal control portion 310 performs the pass/fail determination as to whether or not the determination target character is properly written. When a plurality of determination target characters are present, the pass/fail determination is performed on each of the determination target characters. For example, although there is no particular limitation, the pass/fail determination on the determination target character is performed with an OCR (Optical Character Reader) technology.

When the OCR technology is used to perform the pass/fail determination on the determination target character, the terminal control portion 310 uses, as a standard pattern for pattern matching, the image of the model character acquired from the character database 500. Then, the terminal control portion 310 performs processing (matching processing) for comparing the image of the determination target character with the standard pattern (the image of the model character) corresponding to the determination target character. As a result of the matching processing, when the image of the determination target character can be recognized as a character, the terminal control portion 310 determines that the determination target character is passed whereas when the image of the determination target character cannot be recognized as a character, the terminal control portion 310 determines that the determination target character is failed.

When a rate at which the image of the model character matches the image of the determination target character is equal to or more than a predetermined threshold value (for example, equal to or more than 80 to 90%), it may be determined that the determination target character is passed. Alternatively, only when the standard pattern (the image of the model character) completely matches the image of the determination target character (in this case, the threshold value is 100%), it may be determined that the determination target character is passed. In the configuration described above, the threshold value which is a criterion for the pass/fail determination may be able to be changed.

Figures 10, 11:
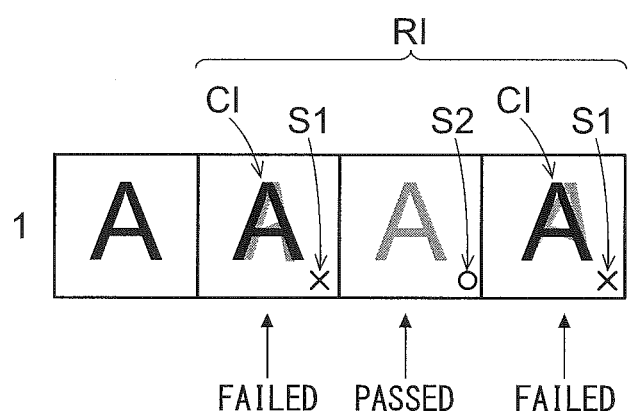
FIG. 10 is a diagram showing an example of a report printed in the learning support device according to the embodiment of the present disclosure.
FIG. 11 is a diagram of an enlarged part (result information) of the report shown in FIG. 10.

After the completion of the pass/fail determination on the determination target character, the process is transferred to step S16. When the process is transferred to step S16, the terminal control portion 310 generates image data on a report RP (see FIGS. 10 and 11) which includes result information RI indicating the result of the pass/fail determination on the determination target character. Here, as shown in FIG. 11, the terminal control portion 310 includes, in the image data on the report RP, as the result information RI, a correction image CI in which the image of the model character is superimposed on the image of the determination target character that is determined to be failed.

Here, the terminal control portion 310 makes the colors of the image of the determination target character and the image of the model character which form the correction image CI differ from each other. For example, the color of the image of the determination target character is black, and the color of the image of the model character is red (in FIG. 11, the color of the determination target character is indicated by light gray as compared with the color of the model character). Furthermore, the terminal control portion 310 adds a failure symbol S1 indicating a failure in the vicinity of the correction image CI (the image of the determination target character that is determined to be failed). Although there is no particular limitation, for example, a symbol of "x" is added as the failure symbol S1. Alternatively, a symbol string (text character string) of "failure" may be added as the failure symbol S1. The failure symbol 51 may be arranged within the square where the image of the determination target character is provided or may be arranged outside the square.

With respect to the image of the determination target character that is determined to be passed, the terminal control portion 310 includes, in the image data on the report RP, as the result information RI, the image of the determination target character without the image being processed. Furthermore, the terminal control portion 310 adds a pass symbol S2 indicating a pass in the vicinity of the image of the determination target character that is determined to be passed. Although there is no particular limitation, for example, a symbol of "O" is added as the pass symbol S2. Alternatively, a symbol string (text character string) of "pass" may be added as the pass symbol S2. The pass symbol S2 may be arranged within the square where the image of the determination target character is provided or may be arranged outside the square.

Although not shown in the figure, information indicating the number of characters in at least one of the determination target characters that are determined to be passed and the determination target characters that are determined to be failed may be used as the result information RI. When a plurality of determination target characters are present, information indicating a proportion of the number of determination target characters that are determined to be passed (or the number of determination target characters that are determined to be failed) in the total number of the plurality of determination target characters may be used as the result information RI. Furthermore, information indicating the rate at which the image of the model character matches the image of the determination target character may be used as the result information RI.

The layout of the report RP (see FIG. 10) is substantially the same as that of the practice sheet P1. In other words, the image data on the report RP includes the image of the model character and the image (not shown) indicating the phonetic symbol of the model character.

With reference back to FIG. 9, after the completion of the generation of the image data on the report RP, the process is transferred from step S16 to step S17. When the process is transferred to step S17, the terminal control portion 310 instructs the terminal communication portion 340 to transmit the image data on the report RP to the multifunctional machine 200. In other words, the multifunctional machine communication portion 230 receives the image data on the report RP from the information processing terminal 300. Here, a print output command based on the image data is added to the image data transmitted from the information processing terminal 300 to the multifunctional machine 200.

When the multifunctional machine communication portion 230 receives the image data on the report RP, the process is transferred to step S18. When the process is transferred to step S18, the multifunctional machine control portion 210 makes the print portion 206 print the report RP. In this way, the report RP as shown in FIG. 10 is output from the multifunctional machine 200.

Here, the report RP may be displayed (output) on the terminal display portion 320. Alternatively, the report RP may be only displayed without being printed. As described above, in the configuration in which the report RP is displayed on the terminal display portion 320, the terminal display portion 320 corresponds to the "output portion". Whether or not the report RP is displayed on the terminal display portion 320 can be arbitrarily set.

After the completion of the printing of the report RP in the multifunctional machine 200, the multifunctional machine control portion 210 instructs the multifunctional machine communication portion 230 to transmit a print completion notification to the information processing terminal 300. When the terminal communication portion 340 receives the notification, in step S19, the terminal control portion 310 determines whether or not the determination target character that is determined to be failed is present. As a result of the determination, when the determination target character that is determined to be failed is present, the process is transferred to step S20 whereas when the determination target character that is determined to be failed is not present, the present flow is completed.

When the process is transferred to step S20, the terminal control portion 310 receives an instruction as to whether or not a re-practice sheet P2 (see FIG. 13) is produced. The re-practice sheet P2 is a sheet for re-practicing how to write a character that is determined to be failed.

Figure 12:
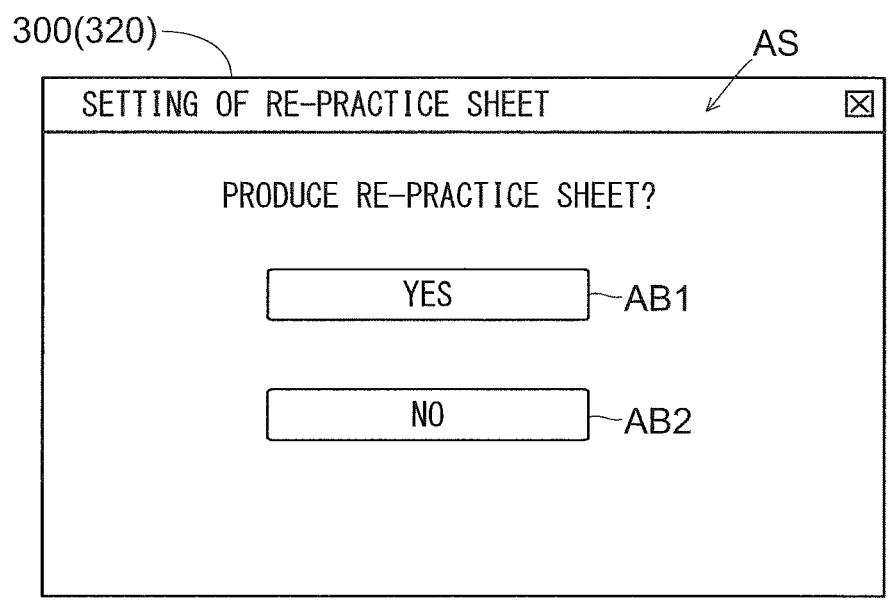
FIG. 12 is a diagram showing an example of a reception screen (screen for receiving whether or not a re-practice sheet is produced) displayed on the learning support device (information processing terminal) according to the embodiment of the present disclosure.

For example, in order to receive the instruction as to whether or not the re-practice sheet P2 (see FIG. 13) is produced, the terminal control portion 310 makes the terminal display portion 320 display a reception screen AS as shown in FIG. 12. In the reception screen AS, reception buttons AB1 and AB2 are provided. The reception button AB1 is a button for receiving an instruction to produce the re-practice sheet P2, and the reception button AB2 is a button for receiving an instruction to prevent the production of the re-practice sheet P2. The reception screen AS is not displayed when all the determination target characters are determined to be passed. In other words, the reception screen AS is displayed when even one determination target character is determined to be failed.

With reference back to FIG. 9, when the instruction to produce the re-practice sheet P2 is received, the process is transferred from step S20 to step S21 whereas when the instruction to prevent the production of the re-practice sheet P2 is received, the present flow is completed. When the process is transferred to step S21, the terminal control portion 310 analyzes the identification information ID corresponding to the determination target character that is determined to be failed in the pass/fail determination, and acquires, from the character database 500 of the terminal storage portion 350, the image of the model character associated with the same character code as the character code obtained by the analysis (in other words, the image of the model character corresponding to the determination target character that is determined to be failed in the pass/fail determination).

Then, in step S22, the terminal control portion 310 generates, as the image data on the re-practice sheet P2, image data which includes the image of the model character corresponding to the determination target character that is determined to be failed in the pass/fail determination (which also includes the image (not shown) indicating the phonetic symbol of the model character). The image data generated here also includes squares indicating the regions (determination regions JA) in which characters corresponding to the model character are handwritten. Furthermore, the image of the identification information ID is also included. After the completion of the generation of the image data on the re-practice sheet P2, the process is transferred to step S23.

After the generation of the image data on the re-practice sheet P2, the preview display of the re-practice sheet P2 may be performed. Furthermore, while the preview display of the re-practice sheet P2 is being performed, the production of the re-practice sheet P2 may be able to be cancelled (for example, a cancel button for receiving the cancellation is provided).

When the process is transferred to step S23, the terminal control portion 310 instructs the terminal communication portion 340 to transmit the image data on the re-practice sheet P2 to the multifunctional machine 200. In other words, the multifunctional machine communication portion 230 receives the image data on the re-practice sheet P2 from the information processing terminal 300. Here, a print output command based on the image data is added to the image data transmitted from the information processing terminal 300 to the multifunctional machine 200.

When the multifunctional machine communication portion 230 receives the image data on the re-practice sheet P2, the process is transferred to step S24. When the process is transferred to step S24, the multifunctional machine control portion 210 instructs the print portion 206 to print the re-practice sheet P2.

Figure 13:
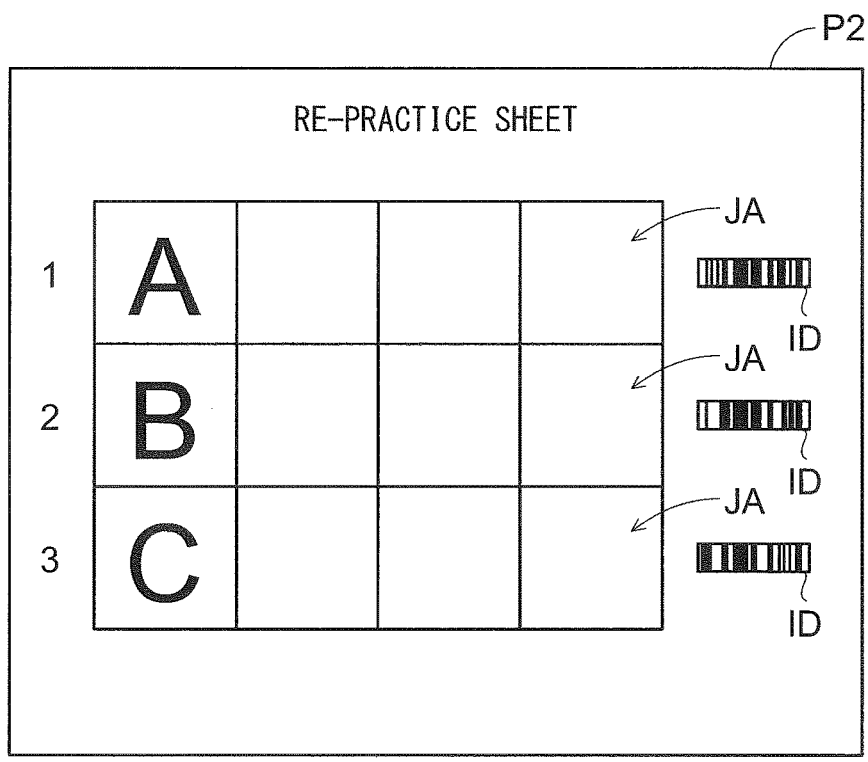
FIG. 13 is a diagram showing an example of the re-practice sheet printed in the learning support device according to the embodiment of the present disclosure.

In this way, the re-practice sheet P2 as shown in FIG. 13 is output from the multifunctional machine 200. Here, on the re-practice sheet P2 output from the multifunctional machine 200, the image of the model character corresponding to the determination target character that is determined to be failed in the pass/fail determination, the image (not shown) indicating the phonetic symbol of the model character and the squares indicating the regions (determination regions JA) in which characters corresponding to the model character are handwritten are printed. Furthermore, the identification information ID on the model character corresponding to the determination target character that is determined to be failed in the pass/fail determination is also printed. In other words, the layout of the re-practice sheet P2 is substantially the same as that of the practice sheet P1 (see FIG. 5). FIG. 13 shows the re-practice sheet P2 when among the characters to be learned in the practice sheet P1, the characters of "A", "B" and "C" are determined to be failed.

For example, when the printing of the re-practice sheet P2 is completed in the multifunctional machine 200, the multifunctional machine control portion 210 instructs the multifunctional machine communication portion 230 to transmit a print completion notification to the information processing terminal 300. When the terminal communication portion 340 receives the notification, the terminal control portion 310 displays, on the terminal display portion 320, for example, a message indicating that the printing of the re-practice sheet P2 is completed. In other words, the terminal display portion 320 displays the message to provide the notification that the printing of the re-practice sheet P2 is completed.

Incidentally, the learning support device 100 can also perform a pass/fail determination as to whether or not a character handwritten on the re-practice sheet P2 is properly written. Specifically, when image data on the re-practice sheet P2 is generated by reading the re-practice sheet P2 with the multifunctional machine 200 (the image reading portion 207), and the image data on the re-practice sheet P2 is acquired from the multifunctional machine 200 (when the terminal communication portion 340 receives the image data on the re-practice sheet P2), the terminal control portion 310 performs the pass/fail determination by regarding the image (the image in the determination region JA) of the character handwritten within the image data on the re-practice sheet P2 as the image of the determination target character.

As described above, the learning support device 100 (the multifunctional machine 200 and the information processing terminal 300) according to the present embodiment includes: the terminal storage portion 350 (storage portion) which stores images of a plurality of model characters corresponding to a plurality of characters to be learned; the image reading portion 207 which reads the practice sheet P1 in which a character is handwritten by the learner to generate image data on the practice sheet P1; the terminal control portion 310 (a determination portion and a generation portion) which extracts, as the image of a determination target character, the image of the handwritten character within the image data on the practice sheet P1, which acquires, from the terminal storage portion 350, the image of the model character corresponding to the determination target character and which compares the image of the model character with the image of the determination target character so as to perform a pass/fail determination as to whether or not the determination target character is properly written; and the print portion 206 (output portion) which outputs the report RP including the result information RI.

In the configuration of the present embodiment, the learning support device 100 reads the practice sheet P1, thereby performs the pass/fail determination as to whether or not the character handwritten by the learner on the practice sheet P1 is properly written and outputs the report RP including the result information RI indicating the result of the pass/fail determination. In this way, since it is not necessary for the instructor himself to perform the pass/fail determination, it is possible to reduce a burden on the instructor.

In this configuration, a learning terminal (for example, a display device with a touch panel) for inputting a character to be learned does not need to be prepared for the learner. In other words, it is only necessary to distribute the practice sheet P1 to the learner to make the learner handwrite the character to be practiced on the practice sheet P1. Hence, even in an educational site where there are a plurality of learners, it is possible to reduce an increase in cost.

The report RP can be printed and output by the multifunctional machine 200. Hence, when the determination result is notified to the learner, the necessary number of reports RP are preferably output and distributed to the learner.

In the present embodiment, as described above, the terminal control portion 310 includes, in the image data on the report RP, as the result information RI, the correction image CI in which the image of the model character is superimposed on the image of the determination target character that is determined to be failed in the pass/fail determination. In other words, the report RP including the correction image RI is printed and output from the multifunctional machine 200. When the correction image CI described above is included in the report RP, the report RP is checked, and thus it is possible to simply grasp a difference (displacement) between the character handwritten by the learner himself and the model character.

In the present embodiment, as described above, the terminal control portion 310 makes the colors of the image of the determination target character and the image of the model character which form the correction image CI differ from each other (for example, the determination target character is black, and the model character is red). In this configuration, it is possible to clearly indicate a difference (displacement) between the character handwritten by the learner himself and the model character.

In the present embodiment, as described above, the terminal control portion 310 adds, to the correction image CI (the image of the determination target character that is determined to be failed), the failure symbol S1 (for example, "x") indicating that the determination target character is failed. In this configuration, it is possible to easily recognize whether the determination target character is determined to be passed or is determined to be failed.

In the present embodiment, as described above, the terminal control portion 310 includes, in the image data on the report RP, as the result information RI, the image of the determination target character that is determined to be passed in the pass/fail determination without the image being processed. In other words, in this case, with respect to the determination target character that is determined to be passed, the output of the report RP where its image is printed without being processed is performed by the multifunctional machine 200 (the image of the determination target character that is determined to be passed is not corrected). In this configuration, the report RP is checked, and thus it is possible to easily grasp the character that is determined to be passed.

In the present embodiment, as described above, the terminal control portion 310 adds, to the image of the determination target character that is determined to be passed in the pass/fail determination, the pass symbol S2 (for example, "O") indicating that the determination target character is passed. In this configuration, it is possible to easily recognize whether the determination target character is determined to be passed or is determined to be failed.

In the present embodiment, as described above, the terminal control portion 310 recognizes the model character based on the identification information ID printed on the practice sheet P1 (or the re-practice sheet P2). In this configuration, it is possible to easily recognize the character which needs to be the model character.

In the present embodiment, as described above, the terminal control portion 310 generates, as the image data on the re-practice sheet P2, the image data which includes the image of the model character corresponding to the determination target character that is determined to be failed in the pass/fail determination and the regions (the determination regions JA partitioned by the squares) in which characters corresponding to the model character are handwritten. Then, the print portion 206 prints and outputs the re-practice sheet P2 based on the image data on the re-practice sheet P2 generated by the terminal control portion 310 (the image data on the re-practice sheet P2 transmitted from the information processing terminal 300 to the multifunctional machine 200). In this configuration, when the learner is made to re-practice how to write the character that is determined to be failed, since it is not necessary to perform an operation of producing the sheet (the sheet is automatically printed and output), the convenience of the user is enhanced.

In the present embodiment, as described above, when the image data on the re-practice sheet P2 is generated by reading the re-practice sheet P2 with the image reading portion 207, the terminal control portion 310 uses, as the image of the determination target character, the image of the handwritten character within the image data on the re-practice sheet P2 to perform the pass/fail determination again. In this configuration, since the instructor himself does not need to perform the pass/fail determination on the character handwritten by the learner on the re-practice sheet P2, the convenience of the instructor is enhanced.

In the present embodiment, as described above, the terminal storage portion 350 stores sheet production information 400 in which characters corresponding to the learning levels classified into a plurality of stages are previously determined. The terminal control portion 310 receives, through the terminal reception portion 330, from the user (the learner or the instructor), the instruction to produce the practice sheet P1, and when the terminal control portion 310 receives the instruction to produce the practice sheet P1, the terminal control portion 310 receives an instruction to select the desired learning level from the learning levels classified into a plurality of stages (the selection screen SS is displayed on the terminal display portion 320). Then, when the terminal control portion 310 receives the instruction to produce the practice sheet P1, the terminal control portion 310 determines, based on the sheet production information 400, the selected character which is the character corresponding to the learning level selected when the instruction to produce the practice sheet P1 is received, and generates, as the image data on the practice sheet P1, the image data which includes the image of the model character corresponding to the selected character and the regions (the determination regions JA partitioned by the squares) in which characters corresponding to the model character are handwritten. The print portion 206 prints and outputs the practice sheet P1 based on the image data on the practice sheet P1 generated by the terminal control portion 310 (the image data on the practice sheet P1 transmitted from the information processing terminal 300 to the multifunctional machine 200). In this configuration, it is possible to easily produce the practice sheet P1 corresponding to the learning level of the learner.

In the present embodiment, as described above, the terminal display portion 320 (display portion) performs the preview display of the practice sheet P1 based on the image data on the practice sheet P1 generated by the terminal control portion 310. In this configuration, before the printing of the practice sheet P1, an operation of checking whether or not an appropriate practice sheet P1 is a target to be printed can be performed. In other words, it is possible to reduce the printing of an inappropriate practice sheet P1.

The embodiment disclosed herein is illustrative in all respects and should not be considered restrictive. The scope of the present disclosure is indicated not by the description of the embodiment but by the scope of claims, and furthermore, meanings equivalent to the scope of claims and all modifications within the scope are included.

For example, on the network NT connected to the multifunctional machine 200 and the information processing terminal 300, a server may be separately provided, and the server may be made to perform the learning support processing (the data generation processing and the pass/fail determination processing).

The application AP may be installed in the multifunctional machine 200 to make the multifunctional machine 200 perform the learning support processing, and the multifunctional machine 200 (the operation panel 208) may be made to receive various types of settings on the learning support processing. In other words, the learning support device 100 may be formed with only the multifunctional machine 200. In this configuration, the multifunctional machine control portion 210 corresponds to the "determination portion" and the "generation portion", the multifunctional machine storage portion 220 corresponds to the "storage portion" and the operation panel 208 corresponds to the "reception portion".

On the network NT connected to the multifunctional machine 200 and the information processing terminal 300, a storage device may be separately provided, and in the storage device, various types of information, such as the sheet production information 400 and the character database 500, necessary for the learning support processing may be stored.

On the practice sheet P1 or the re-practice sheet P2, identification information on the learner may be printed (for example, the identification information on the learner is printed in the form of a barcode or a QR code (registered trade mark)). In this configuration, the image of the identification information on the learner obtained by reading the practice sheet P1 or the re-practice sheet P2 is analyzed, and thus it is possible to determine the learner on which the pass/fail determination is performed. Thus, it is possible to easily manage, for example, learning history and results (the result of the pass/fail determination) on the learner.

What is claimed is:

1. A learning support device for supporting a learner who learns how to write a character and an instructor who instructs the learner, the learning support device comprising:
   a storage portion which stores images of a plurality of model characters corresponding to a plurality of characters to be learned;
   an image reading portion which reads a practice sheet where a character is handwritten by the learner so as to generate image data on the practice sheet where the character is handwritten by the learner;
   a determination portion which extracts, as an image of a determination target character, an image of the handwritten character present within the image data on the practice sheet where the character is handwritten by the learner, which acquires, from the storage portion, among the model characters, an image of a model character corresponding to the determination target character and which compares the image of the model character with the image of the determination target character so as to perform a pass/fail determination as to whether or not the determination target character is properly written;
   a generation portion which generates image data on a report that includes result information indicating a result of the pass/fail determination performed by the determination portion;
   an output portion which outputs the report including the result information;
   a display for displaying a screen for receiving an instruction to produce the practice sheet where no character is handwritten by the learner and an instruction to execute the pass/fail determination; and
   a reception portion which receives the instruction to produce the practice sheet where no character is handwritten by the learner and the instruction to execute the pass/fail determination and which receives, when receiving the instruction to produce the practice sheet where no character is handwritten by the learner, an instruction to select a desired learning level from learning levels classified into a plurality of stages,
   wherein
   the storage portion stores sheet production information in which characters corresponding to the learning levels classified into the plurality of stages are previously determined,
   when the reception portion receives the instruction to produce the practice sheet where no character is handwritten by the learner,
   the generation portion determines, based on the sheet production information, a selected character which is a character corresponding to the desired learning level selected when the instruction to produce the practice sheet where no character is handwritten by the learner is received and generates, as the image data on the practice sheet where no character is handwritten by the learner, image data which includes the image of the model character corresponding to the selected character, a region in which a character corresponding to the model character is handwritten, and the identification information for identifying the model character, and
   the output portion is a print portion which prints an image on a sheet and which outputs the sheet, and prints and outputs the practice sheet where no character is handwritten by the learner based on the image data, generated by the generation portion, on the practice sheet where no character is handwritten by the learner, and
   when the reception portion receives the instruction to execute the pass/fail determination,
   the image reading portion reads the practice sheet where the character is handwritten by the learner so as to generate image data on the practice sheet where the character is handwritten by the learner, and
   the determination portion performs the pass/fail determination.

2. The learning support device according to claim 1, wherein the generation portion includes, in the image data on the report, as the result information, a correction image in which the image of the model character is superimposed on the image of the determination target character that is determined to be failed in the pass/fail determination.

3. The learning support device according to claim 2, wherein the generation portion makes a color of the image of the determination target character and a color of the image of the model character which form the correction image differ from each other.

4. The learning support device according to claim 2, wherein the generation portion adds, to the correction image, a failure symbol indicating that the determination target character is failed.

5. The learning support device according to claim 1, wherein the generation portion includes, in the image data on the report, as the result information, the image of the determination target character that is determined to be passed in the pass/fail determination without the image being processed.

6. The learning support device according to claim 5, wherein the generation portion adds, to the image of the determination target character that is determined to be passed in the pass/fail determination, a pass symbol indicating that the determination target character is passed.

7. The learning support device according to claim 1,
wherein the output portion is a print portion which prints an image on a sheet and which outputs the sheet, and
the report is a print product which is printed and output by the print portion.

8. The learning support device according to claim 1,
wherein, when any determination target character is determined to be failed in the pass/fail determination, the generation portion generates, as image data on a re-practice sheet, image data which includes the image of the model character corresponding only to the determination target character that is determined to be failed and a region in which a character corresponding to the model character is handwritten, the image data on the re-practice sheet not including the image of the character handwritten by the learner, and
the output portion is a print portion which prints an image on a sheet and which outputs the sheet, and prints and outputs the re-practice sheet where no character is handwritten by the learner based on the image data on the re-practice sheet generated by the generation portion.

9. The learning support device according to claim 8,
wherein when the image data on the re-practice sheet where a character is handwritten by the learner is generated by reading, with the image reading portion, the re-practice sheet where the character is handwritten by the learner, the determination portion uses, as the image of the determination target character, an image of the handwritten character within the image data on the re-practice sheet where the character is handwritten by the learner so as to perform the pass/fail determination.

10. The learning support device according to claim 1 wherein
the display portion displays a preview of the practice sheet where no character is handwritten by the learner based on the image data, generated by the generation portion, on the practice sheet where no character is handwritten by the learner.

11. A learning support method for supporting a learner who learns how to write a character and an instructor who instructs the learner, the learning support method comprising:
receiving an instruction to produce a practice sheet where no character is handwritten by the learner and an instruction to execute a pass/fail determination and, when receiving the instruction to produce the practice sheet where no character is handwritten by the learner, receiving an instruction to select a desired learning level from learning levels classified into a plurality of stages;
on receiving the instruction to produce the practice sheet where no character is handwritten by the learner, determining, based on sheet production information, in which characters corresponding to the learning levels classified into the plurality of stages are previously determined, a selected character which is a character corresponding to the desired learning level selected when the instruction to produce the practice sheet where no character is handwritten by the learner is received and generating, as the image data on the practice sheet where no character is handwritten by the learner, image data which includes an image of a model character corresponding to the selected character from images of a plurality of model characters corresponding to a plurality of characters to be learned, a region in which a character corresponding to the model character is handwritten, and the identification information for identifying the model character;
printing and outputting the practice sheet where no character is handwritten by the learner based on the image data on the practice sheet where no character is handwritten by the learner;
on receiving the instruction to execute the pass/fail determination, reading a practice sheet where a character is handwritten by the learner so as to generate image data on the practice sheet where the character is handwritten by the learner;
extracting, as an image of a determination target character, an image of the handwritten character present within the image data on the practice sheet where the character is handwritten by the learner, acquiring, from a storage portion which stores the images of the plurality of model characters, an image of the model character corresponding to the determination target character and comparing the acquired image of the model character with the image of the determination target character so as to perform a pass/fail determination as to whether or not the determination target character is properly written;
generating image data on a report that includes result information indicating a result of the pass/fail determination; and
outputting the report including the result information.

* * * * *